Figure 1:
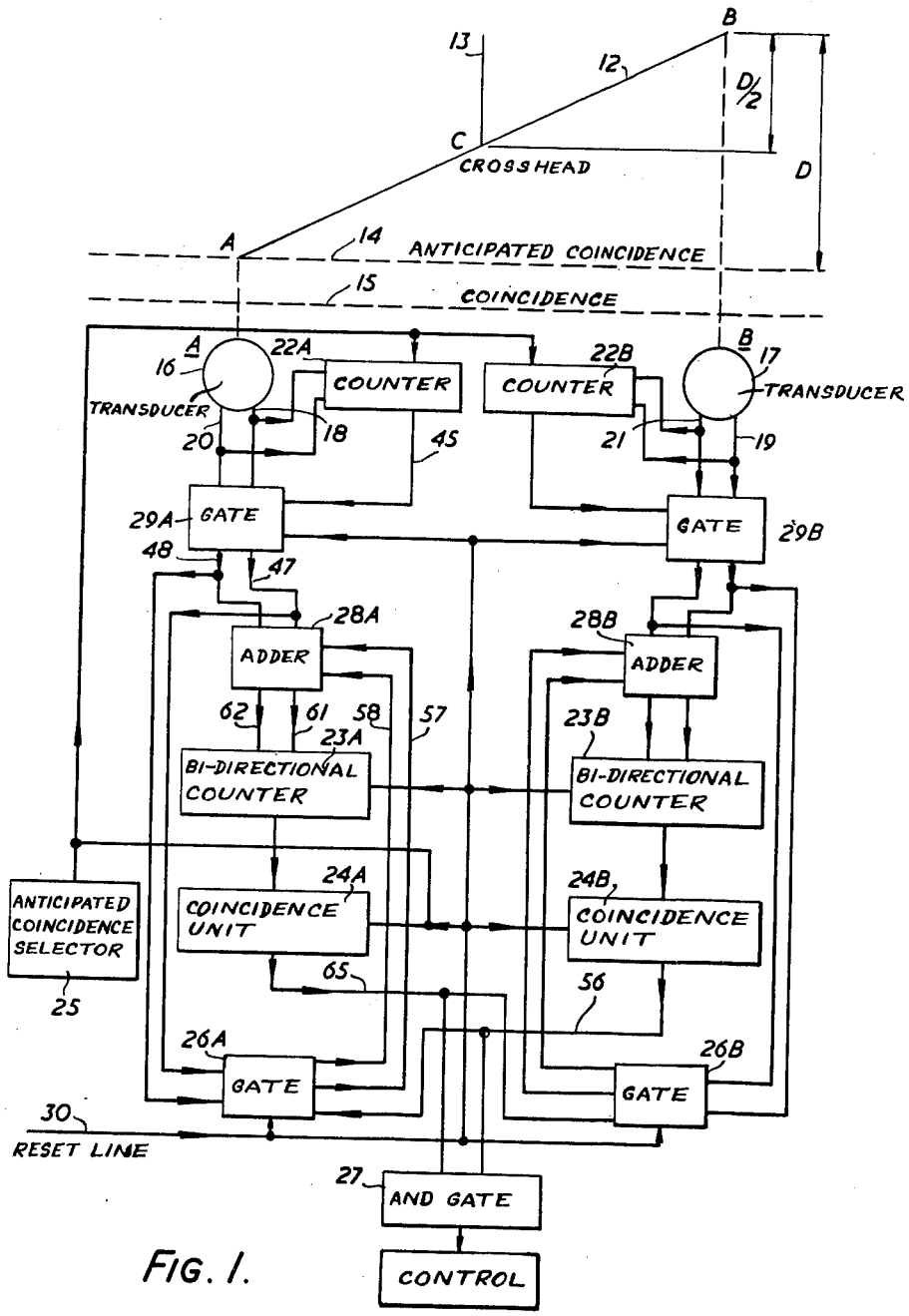

3,200,241
CONTROLLING OR DETECTING APPARATUS
James Arthur Harrison, Brimington Common, Chesterfield, England, assignor to Davy and United Engineering Company, Sheffield, England
Filed June 4, 1962, Ser. No. 199,894
Claims priority, application Great Britain, June 2, 1961, 19,963/61
8 Claims. (Cl. 235—92)

This invention relates to controlling or detecting apparatus and is particularly concerned with such apparatus for controlling or detecting the position of the movable part of a press. The movable part may be the crosshead, or the frame (which comprises an upper entablature and a lower entablature joined together by columns), the columns passing through the crosshead (which is, in this case, stationary). Normally, it is the crosshead which moves relatively to the frame, and reference will be made in this specification to the control or detection of the position of the crosshead. However it will be appreciated that the invention is equally applicable to the detection or control of the position of the frame, when the crosshead is stationary and the frame moves.

For accuracy of pressing, it is very desirable that the position of the centre of the crosshead, which is assumed for the moment to be the movable member, should be capable of accurate location and control. For example, it is desirable that the crosshead should be capable of coming to rest, at the end of a squeeze, with the centre of the crosshead, i.e., the position of the crosshead measured down the centre line of the press, accurately positioned, irrespective of whether or not the crosshead is tilted from its proper disposition, which is normally horizontal. It is difficult, if not impossible to measure the position of the crosshead centre directly, firstly because the centre of the crosshead, is inaccessible so that suitable measuring members cannot usually be secured thereto, and, secondly because any measuring member that can be so secured is liable to damage during operation of the press.

While reference has been made to the detection or control of the position of a crosshead, it will be understood that the invention is applicable to the detection or control of the position of any member which is adapted to move along a prescribed path, but which is liable additionally to tilt.

In accordance with one aspect of the present invention, apparatus for controlling or detecting the position of a member, which is adapted to move along a prescribed path but which is liable additionally to tilt, comprises means for separately measuring the positions along the path of point on opposite sides of the member, and computing means controlled by the two measuring means for giving a signal according to the mean position of the member along the path.

In accordance with another aspect of the invention, apparatus for controlling or detecting the position of a movable member which is adapted to move along a prescribed path but which is liable to tilt comprising separate detectors capable of emitting signals respectively when points on the two sides of the member reach a given position, and including means for applying such a signal when emitted by each detector to the other detector to modify the operation of that other detector so that if the member is tilted the first detector to emit the signal causes the other detector to emit a signal not at the given position but at a position between the given position and the position of the other detector when the first detector emits the signal. Where the forge member is to be controlled to stop at a prescribed position, the given position is selected for that purpose, and the signal emitted by the second detector to operate is used to prevent further movement of the press member.

The invention will be more readily understood by way of example from the following description of detecting apparatus for the crosshead of a forging press, reference being made to the accompanying drawings of which:
FIGURE 1 diagrammatically illustrates the system, and
FIGURES 2 to 5 diagrammatically illustrate some of the units of FIGURE 1.

In FIGURE 1 the crosshead is represented diagrammatically by the line 12 and is shown, for the sake of illustration, as tilted by an amount D from its proper horizontal disposition. Line 13 represents the centre line of the press. The system is intended to emit a control signal when the centre C of the crosshead reaches an "anticipated coincidence" vertical position 14. This control signal is arranged, in known manner, to halt further movement of the crosshead 12 when its centre C reaches a "coincidence" position 15. For example, the control signal may cut off the power driving the crosshead downwards so that the inertia of the crosshead causes the centre C of the crosshead to come to rest at the coincidence position 15.

A separate detector is provided for each side of the crosshead, to detect the positions of the sides. Thus, similar electrical transducers may be mounted on the stationary frame and coupled to the two sides A, B of the crosshead 12 by means of chains or by lead screws. In the example illustrated, the detectors 16, 17 are each designed to give one pulse respectively on lines 18, 19 for each unit of downward movement of the sides A, B respectively of the crosshead, and to each give one pulse respectively on lines 20, 21 for each unit of upward movement of the sides A, B of the crosshead. For this purpose, each transducer may be of the analogue type, for example a magslip or synchro transmitter-receiver system or a potentiometer, in which case an analogue-to-digital converter is provided to supply a pulse output, or may be a rotor pulse generator or other digital transducer.

The pulse from the transducers 16, 17 are applied to main bi-directional counters 22A, 22B respectively, so that pulses on lines 18, 19 increase the count in the respective counter while pulses on lines 20, 21 decrease the count. A selector 25, which is set according to the required anticipated coincidence position 14, controls the counters 22A, 22B so that control pulses are applied by these counters to gates 29A, 29B when the counts in the main counter 22 reach a count differing from the count value set in selector 25 by a preset amount which is greater than the maximum value of D. When counters 22A, 22B open gates 29A, 29B, the pulses on lines 18–21 are fed through adders 28A, 28B to further bi-directional counters 23A, 23B. The outputs from the counters 23A, 23B are applied to coincidence units 24A, 24B respectively which compare the counts in counters 23A, 23B with the preset value, derived from selector 25. On coincidence between the count in the respective counter 23 and the preset value from selector 25, the coincidence unit 24A, 24B emit pulse outputs which are applied both to an AND gate 27 and to gates 26B, 26A respectively. Gates 26A, 26B receive pulses passed by gates 29A, 29B respectively and, when open by the outputs from units 24B, 24A respectively, pass those pulses to adders 28A, 28B respectively. Adders 28 pass to counters 23 pulses received both directly from gates 29 and from gates 26 when opened. Only when it is operated by both units 24A and 24B, does AND gate 27 produce an output, which is applied to the control system for the forge, as described above.

In operation, as the crosshead 12 descends towards the anticipated coincidence position 14, the counts in the counters 23A, 23B, after being rendered effective by gates 29A, 29B, increase progressively until they reach the preset value derived from selector 25 when pulses are emitted by the coincidence units 24A, 24B. If, during the downward movement, the crosshead 12 is horizontal, with the two sides A, B at the same vertical positions, then both counters 23A, 23B start receiving pulses at the same time, and count at the same rate, so that coincidence is detected by units 24A, 24B simultaneously and the simultaneous application of pulses by units 24 to the AND gate 27 produces an output to operate the press control system and to cause the crosshead 12 to halt when it reaches position 15.

If, on the other hand, the crosshead 12 descends in a tilted disposition as shown, with the side A at the vertical distance D below side B, then gate 29A is opened first, and counter 23A records to count corresponding to distance D before gate 29B is opened and counter 23B starts to receive counting pulses; side A reaches position 14 before side B and a pulse is emitted by the coincidence unit 24A, without similar pulse from coincidence unit 24B. The pulse from coincidence unit 24A causes gate 26B to open and to permit pulses from gate 29B to pass through gate 26B to the adder 28B. Counter 23B thus receives, for each unit of crosshead movement, a pulse directly from gate 29B and slightly later, owing to the delay in the circuit, a pulse from gate 26B, and each subsequent unit of downward movement of the crosshead causes an increase of two digits in the count in counter 23B. As a result, the count in counter 23B equals the preset value derived from selector 25, not after a further descent of the crosshead 12 by a distance D, but instead after a descent of $D/2$. This causes the coincidence unit 24B to emit a pulse to the AND gate 27, and to operate the press control system, when the centre C of the crosshead 12 reaches the position 14. Therefore, the press control system is operated, when the centre C reaches position 14, to halt the crosshead with its centre C at position 15, regardless of the tilt of the crosshead.

It will be appreciated that if the crosshead is tilted in the opposite sense so that side B reaches position 14 before side A, the counting rate of counter 23A is doubled in exactly the same manner as has been described in relation to counter 23B, so as to produce a control pulse from AND gate 27 when the centre C of the crosshead reaches position 14, as before.

When the press crosshead starts its reverse stroke, a signal is applied to a reset line 30 to reclose gates 26A, 26B, 29A, 29B and resets the counters 23A and 23B and the coincidence units 24A and 24B in readiness for the next forging stroke.

Where the connections between the sides of the crosshead 12 and the transducers 16, 17 extend between parts of the press between which relative movement occurs, due to strain of the press, when the press is operated to stress an object being forged, the apparatus may be modified as described in co-pending British specification No. 21,632/61, now British Patent No. 968,550.

FIGURES 2 to 5 show the arrangements of the elements making up some of the units shown in block form in FIGURE 1. These elements are of standard types, such as those manufactured by Mullard Equipment Ltd., and described in their publication entitled, "Electronic Sub-assemblies for Control and Instrumentation."

Figure 2:
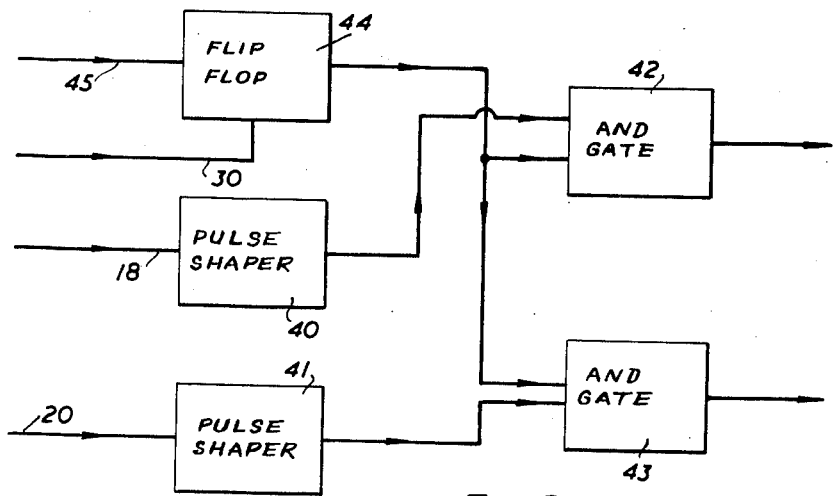

FIGURE 2 illustrates one of the gates 29. Two pulse shapers 40, 41, receive the add and subtract pulses on lines 18 and 20 respectively from the pulse generator and emit outputs individually to two input AND gates 42, 43. The rise time of these outputs is such as to ensure that reliable triggering results from them and the voltage output level is correct for feeding the AND gates 42, 43.

A flip-flop 44 is connected to the second input of each AND gate so that its voltage level keeps the AND gates 42, 43 closed until it receives on line 45 a pulse from counter 22 which triggers the flip-flop in its second stable state and opens the AND gates until a reset pulse is received on the line 30.

Figure 3:
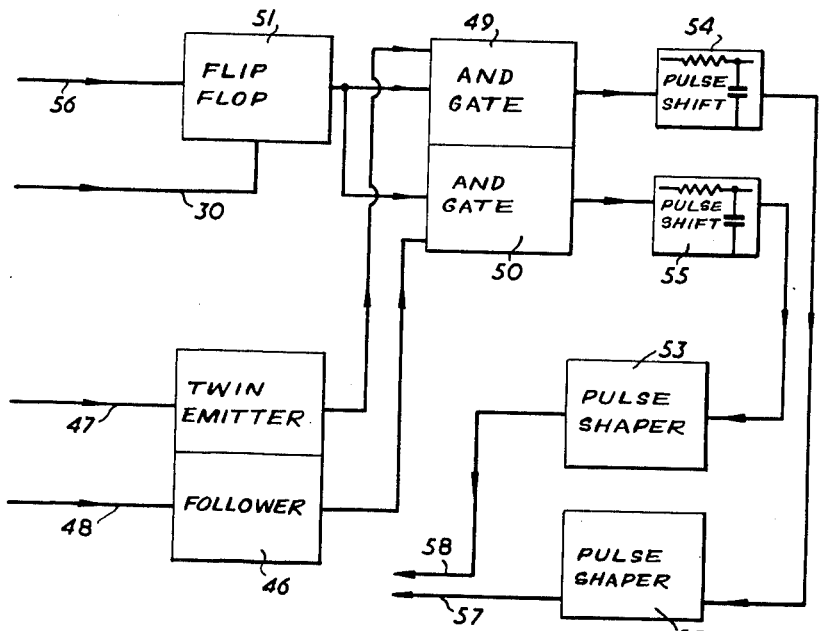
Figure 4:
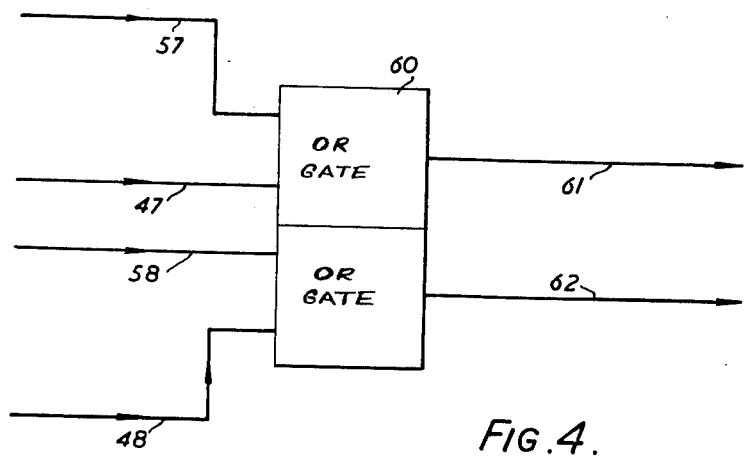

The gate 26A shown in FIGURE 3 has a twin emitter follower 46 (to reduce loading of the AND gate 29) which receives the ADD and SUBTRACT pulses from gates 29 on lines 47, 48 and is connected to one terminal of each of two input AND gates 49, 50. The other terminal of each AND gate type 22A1 is connected to a flip-flop 51. The output terminals of AND gates 49, 50 are connected to pulse shaper 52, 53 through phase shift networks 54, 55.

The AND gates 49, 50 are normally held closed by the voltage level of the flip-flop 51, until the flip-flop is triggered by a pulse from coincidence unit 24B on line 56 when it changes to its other stable state leaving the AND gates open until the flip-flop receives a reset pulse on the line 30.

When the AND gates 49, 50 are open they pass ADD and SUBTRACT pulses respectively through the phase shift networks and pulse shapers via lines 57, 58 to the adder 28A. The adder 28A shown in FIGURE 4 comprises a twin two input OR gate 60. The unit separately combines the add and subtract pulses from gate 29, on lines 47, 48 and from gate 26 on lines 57, 58 and feeds out the two sets of pulses on common add and subtract lines 61, 62.

Figure 5:
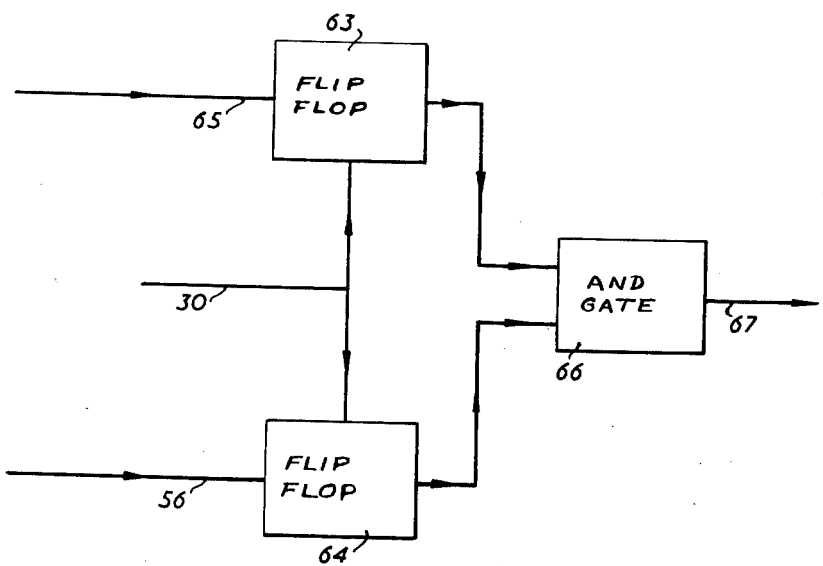

The AND unit 27 shown in FIGURE 5 comprises two flip-flops 63, 64 which receive the outputs from the coincidence units 24A and 24B on lines 65 and 56, respectively. Each flip-flop is connected to a terminal of a two input AND gate 66.

The AND gate is normally held closed by the voltage level of each flip-flop 63, 64 until both flip-flops have been triggered to their other stable state which opens the AND gate 66 to pass triggering pulses on line 67 until a reset pulse on line 30 returns the flip-flops to their normal closed state.

Suitable elements made by Mullard Equipment Ltd., may be of the following types:

| | Type |
|---|---|
| Pulse shapers 40, 41, 52, 53 | P.S.1 |
| Flip-flops 44, 51, 63, 64 | F.F.1 |
| AND gates 42, 43, 49, 50 | 22A1 |
| OR gates 60 | 2201 |
| Twin emitter follower 46 | 2 E.F.1 |

Pulse generators 16, 17 may be of Rotapulse Type 191A manufactured by Ericcson.

I claim:
1. Apparatus for controlling or detecting the position of a movable member which is adapted to move along a prescribed path but which is liable to tilt comprising separate detectors capable of emitting signals respectively when points on the two sides of the member reach a given position and including means for applying such a signal when emitted by each detector to the other detector to modify the operation of that other detector so that if the member is tilted the first detector to emit the signal causes the other detector to emit a signal not at the given position but at a position between the given position and the position of the other detector when the first detector emits the signal.

2. Apparatus for controlling or detecting the position of a movable member, which is adapted to move along a prescribed path but which is liable to tilt, comprising separate detectors capable of counting each unit of movement of points on the two sides of the member respectively and of emitting signals when such points reach a given position, means for applying such a signal when emitted by each detector to the other detector, and means operable by such signal to cause the other detector to count double for each unit of movement of its detected point on the member.

3. Apparatus according to claim 1 in which each detector includes a pulse generator, a bi-directional counter and a coincidence unit, each pulse generator being arranged to emit pulses, one for each unit of movement of its detected point along the prescribed path, and to apply such pulses through its associated bi-directional counter to its associated coincidence unit which coincidence unit is arranged to receive a count representing the given position, to compare such count with the count from its bi-directional counter and to emit the signal when the counts are equivalent.

4. Apparatus according to claim 3 in which the means associated with each detector for modifying the operation of the other detector comprises a unit arranged to receive the signal from the other coincidence unit, and operable by such signal to make its associated bi-directional counter count two for each unit of movement of its detected point on the member along its prescribed path.

5. Apparatus according to claim 3 comprising an AND gate arranged to receive the signal from each coincidence unit and to emit a further signal when it has received each of the said signals.

6. Apparatus according to claim 5 comprising control means arranged to receive the further signals and operable by such signal to stop the mean point of the member between the detected points at a required position.

7. Apparatus according to claim 5 which comprises means for resetting the bi-directional counter coincidence units, units and AND gate after the further signal has been emitted.

8. Apparatus for detecting the position of the center of a forging press crosshead adapted to move along a prescribed path, but capable of deviating from a prescribed angular position relative to said path, said apparatus comprising means for separately measuring the displacement along said path of two points on opposite sides of the crosshead equidistant from its center, and computing means controlled by said measuring means for giving a signal indicative of the position of said crosshead center along the path.

References Cited by the Examiner

UNITED STATES PATENTS 3,090,896    5/63    Bowden et al. _____ 318—19

MALCOLM A. MORRISON, *Primary Examiner.*